Mar. 13, 1923.
I. H. SCLATER.
SHEET METAL CASING.
FILED MAY 4, 1920.
1,448,005.
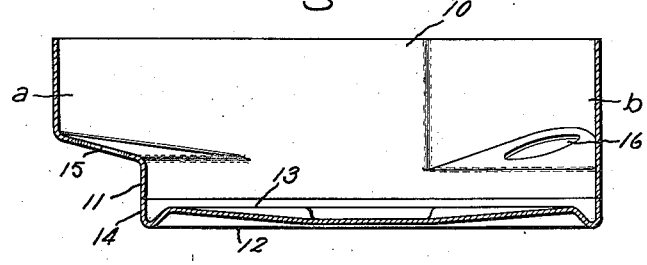
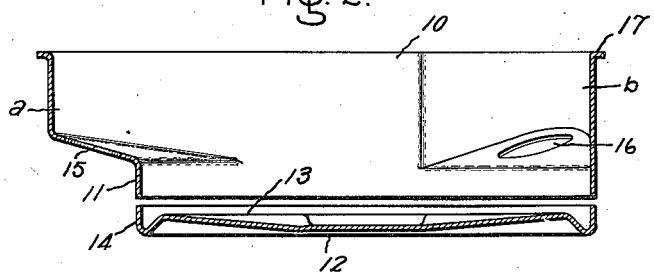
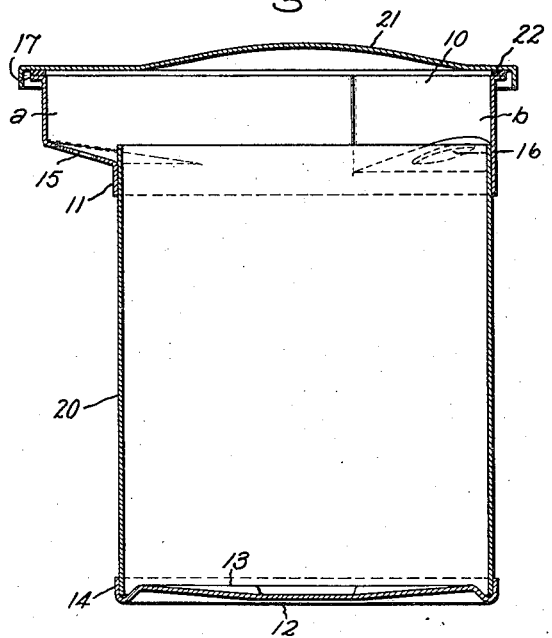
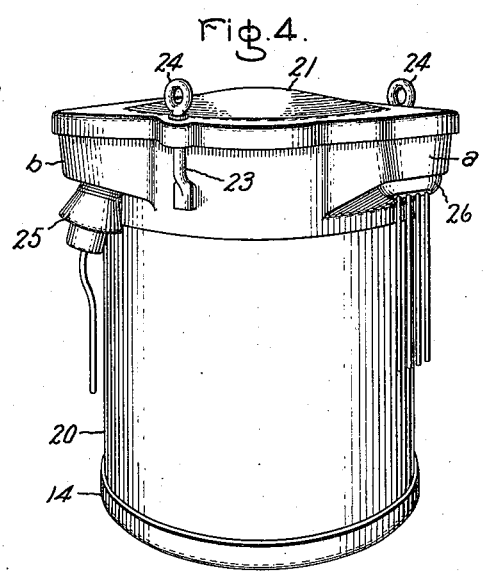
Inventor:
Ivanhoe H. Sclater,
by *Albert G. Davis*
His Attorney.

Patented Mar. 13, 1923.

1,448,005

UNITED STATES PATENT OFFICE.

IVANHOE H. SCLATER, OF PITTSFIELD, MASSACHUSETTS, ASSIGNOR TO GENERAL ELECTRIC COMPANY, A CORPORATION OF NEW YORK.

SHEET-METAL CASING.

Application filed May 4, 1920. Serial No. 378,841.

*To all whom it may concern:*

Be it known that I, IVANHOE H. SCLATER, a citizen of the United States, residing at Pittsfield, in the county of Berkshire, State of Massachusetts, have invented certain new and useful Improvements in Sheet-Metal Casings, of which the following is a specification.

My invention relates to sheet metal casings for containing electrical apparatus and has for its object an improved method of producing casings of this character.

Prior to my invention, it has generally been the custom to make casings for electrical apparatus, such as transformers and the like, of cast metal. This was a very expedient way to provide such casings as they generally require specially formed compartments for the apparatus proper and for the electrical outlets and bushings. Sheet metal containers have heretofore been proposed to take the place of the cast ones because they obviate the necessity for keeping on hand a large stock of patterns and molders' flasks for the set of sizes desired and also for the reason that such sheet metal casings would be lighter while possessing the requisite strength. The cost of making the desired compartments in the casing by welding methods has heretofore made the sheet metal container entirely unfeasible from a manufacturing point of view.

By my invention, however, a sheet metal casing is made which is provided with the desired compartments for apparatus and outlets at a very materially reduced cost whereby all the advantages of sheet metal casings are had without the previous attendant disadvantages. In accomplishing this end, I take a sheet of metal, generally steel, and by the aid of suitably formed dies draw from the metal a portion of the casing which provides the special compartments and weld to it a major or body portion of the casing made from a second sheet and which may be cylindrical in form; such casing being designed to have an end closed by a portion cut away from the drawn sheet. A casing is thus produced without appreciable waste and from substantially a minimum of material with the added advantage that the same set of tools is adapted to make tanks of varying heights thereby greatly expediting manufacturing processes and reducing the cost of the product.

For a more complete understanding of the nature and objects of my invention reference should be had to the following detailed description when taken in conjunction with the accompanying drawing in which:

Fig. 1 shows a section through a sheet of metal which has been drawn in accordance with my invention to provide that portion of the casing containing special compartments; Fig. 2 shows this drawn sheet with a portion cut away preparatory to having the major portion of the casing secured to it; Fig. 3 shows a section through an assembled casing made in accordance with my invention; while Fig. 4 shows, on a reduced scale, a perspective view of the same tank or casing.

Referring now to the drawing, and to Fig. 1 in particular, a plain sheet of metail is drawn by one or more operations and with the aid of suitable dies into the shape here depicted, suitable to serve as the top band of the casing in which 10 denotes an upstanding side wall generally circular in contour but drawn out laterally at a plurality of points, here indicated as three; one point being at $a$, and another at $b$, the third not being shown but being symmetrically located in the portion cut away in the sectional views.

That portion 11 of the wall 10 below the distended or laterally drawn out portions retains a continuous regular and preferably circular contour and provides a suitable band for welding purposes. The undrawn or central portion of the sheet is shown at 12. This central portion is cut away and is preferably provided with radial ribs 13 so as to strengthen the bottom wall. This central portion is so severed from the wall 10 as to provide it with an upstanding rim 14 about its entire periphery when completely cut away from the drawn sheet as indicated in Fig. 2.

The laterally drawn out or distended portions $a$, $b$, etc., of the wall 10 have suitable openings as 15 and 16 cut therethrough at the desired points to provide outlets for the casing in which to secure bushings or other accessories for the apparatus housed in the casing.

The drawn band formed when the central or bottom portion 12 is cut away from the drawn sheet as indicated in Fig. 2 is adapted to be welded on the major portion of the casing and is preferably provided with a rolled over upper edge, as shown at 17, in order to increase the bearing surface for the cover of the casing.

The major portion of the casing is shown at 20 in Fig. 3 and is made by welding together two parallel or substantially parallel edges of another metal sheet. The portion so welded is given a contour in horizontal cross-section conforming with that of the lower portion of the band or wall 10, which here for convenience of illustration is shown as circular. The welded cylinder 20 thus formed is pushed or telescoped into the lower portion of the band or wall 10 and welded circumferentially therein. The top edge of the cylinder 20 is pushed up above the bottom wall of the distensions $a$, $b$, etc. so as to form veritable pockets at these points suitable for retaining insulating material about the bushing or other accessory secured in the openings in such distensions. It will of course be understood as mentioned above that the height of the major portion 20 may be varied as desired to accommodate different sized electrical apparatus, the range of heights being limited only by the shop equipment, and that the sheet of metal from which such portion is made need not always be plain; a corrugated sheet in some instances may be preferred.

To close the bottom of the casing, the central portion 12, shown in Fig. 2, is placed over the lower end of the cylinder 20 like a cap and welded thereon. The casing thus formed has its top closed by a cover 21 which may be drawn or otherwise suitably formed, a gasket 22 being shown between the cover 21 and the rim 17 so as to make a weather-tight joint. This cover is shown as secured by means of bolts 23 in Fig. 4 welded or otherwise secured exteriorly to the band or wall 10 and extending through suitable holes in the cover to receive nuts or lifting eyes 24.

The casing in Fig. 4 is represented as housing a transformer or like electrical apparatus, the leads from which extend out through bushings shown at 25 and 26, the same being secured in the openings in the pockets formed by the distended portions as hereinbefore described.

In the above I have referred to the uniting together of the edges of the sheet metal employed by welding. While this is preferable, it obviously is only one of a number of ways of uniting the edges, since it is evident that brazing, etc., might well be employed as an equivalent method of uniting the edges of the sheet metal.

Having now described an embodiment of my invention which is at present the best means known to me for carrying the same into effect, I would have it understood that this is merely illustrative and that I do not mean to be limited thereby to the precise details shown, nor restricted in the choice of recognized equivalents except as defined in my claims hereunto annexed.

What I claim as new and desire to secure by Letters Patent of the United States, is:—

1. The method of forming a casing for electrical apparatus, said method including the steps of drawing a sheet metal top band with lateral distensions above its lower edge, forming a main body portion to fit therein, and securing said top band to the main body portion, whereby pockets are formed by said distensions.

2. The method of forming a casing for electrical apparatus, said method including the steps of drawing a sheet metal top band with lateral distensions above its lower edge, forming openings in said distensions for bushings, forming a main body portion to fit into said top band, and securing said top band to the main body portion with said body portion extending above the bottoms of said distensions, whereby pockets are formed by said distensions.

In witness whereof I have hereunto set my hand this 30th day of April, 1920.

IVANHOE H. SCLATER.